United States Patent [19]
Yasuda et al.

[11] Patent Number: 5,753,911
[45] Date of Patent: May 19, 1998

[54] ELECTROSTATIC ACTUATOR, PROBE USING THE ACTUATOR, SCANNING PROBE MICROSCOPE, PROCESSING APPARATUS, AND RECORDING/REPRODUCING APPARATUS

[75] Inventors: Susumu Yasuda, Machida; Takayuki Yagi, Yokohama, both of Japan

[73] Assignee: Canon Kabushiki Kaisha, Tokyo, Japan

[21] Appl. No.: 783,847

[22] Filed: Jan. 16, 1997

[30] Foreign Application Priority Data

Jan. 19, 1996 [JP] Japan ................................. 8-026103

[51] Int. Cl.⁶ ................................................. H01J 37/20
[52] U.S. Cl. .................. 250/306; 250/442.11; 310/304; 369/126
[58] Field of Search .............. 250/306, 442.11; 310/309; 369/126

[56] References Cited

U.S. PATENT DOCUMENTS

| | | | |
|---|---|---|---|
| 4,668,865 | 5/1987 | Gimzewski et al. | 250/306 |
| 4,906,840 | 3/1990 | Zdeblick et al. | 250/306 |
| 5,283,437 | 2/1994 | Greschner et al. | 250/306 |
| 5,574,279 | 11/1996 | Ikeda et al. | 250/306 |

FOREIGN PATENT DOCUMENTS

| | | |
|---|---|---|
| 62-281138 | 12/1987 | Japan . |
| 63-161552 | 7/1988 | Japan . |
| 63-161553 | 7/1988 | Japan . |
| 4230723 | 8/1992 | Japan . |

OTHER PUBLICATIONS

Binnig et al. "Scanning Tunneling Microscopy", Helv. Phys. Acta, vol. 55, pp. 726–735, 1982.

Peterson, IBM J. Res. Dev., vol. 24, No. 5, pp. 631–637, Sep. 1980.

Cheung, "Modeling and Position–Detection of a Polysilicon Linear Microactuator" DSC–vol. 32, Micromechanical Sensors, Actuators, and Systems ASME 1991, pp. 269–278.

Primary Examiner—Jack I. Berman
Attorney, Agent, or Firm—Fitzpatrick, Cella, Harper & Scinto

[57] ABSTRACT

An electrostatic actuator includes a movable plate arranged on a substrate through a gap, a movable electrode arranged on the movable plate, and a fixed electrode arranged on the substrate to oppose the movable electrode. The movable electrode and the fixed electrode are arranged not to overlap at any portion in a direction perpendicular to a surface of the fixed electrode. The movable electrode and the fixed electrode have comb-like shapes.

7 Claims, 11 Drawing Sheets

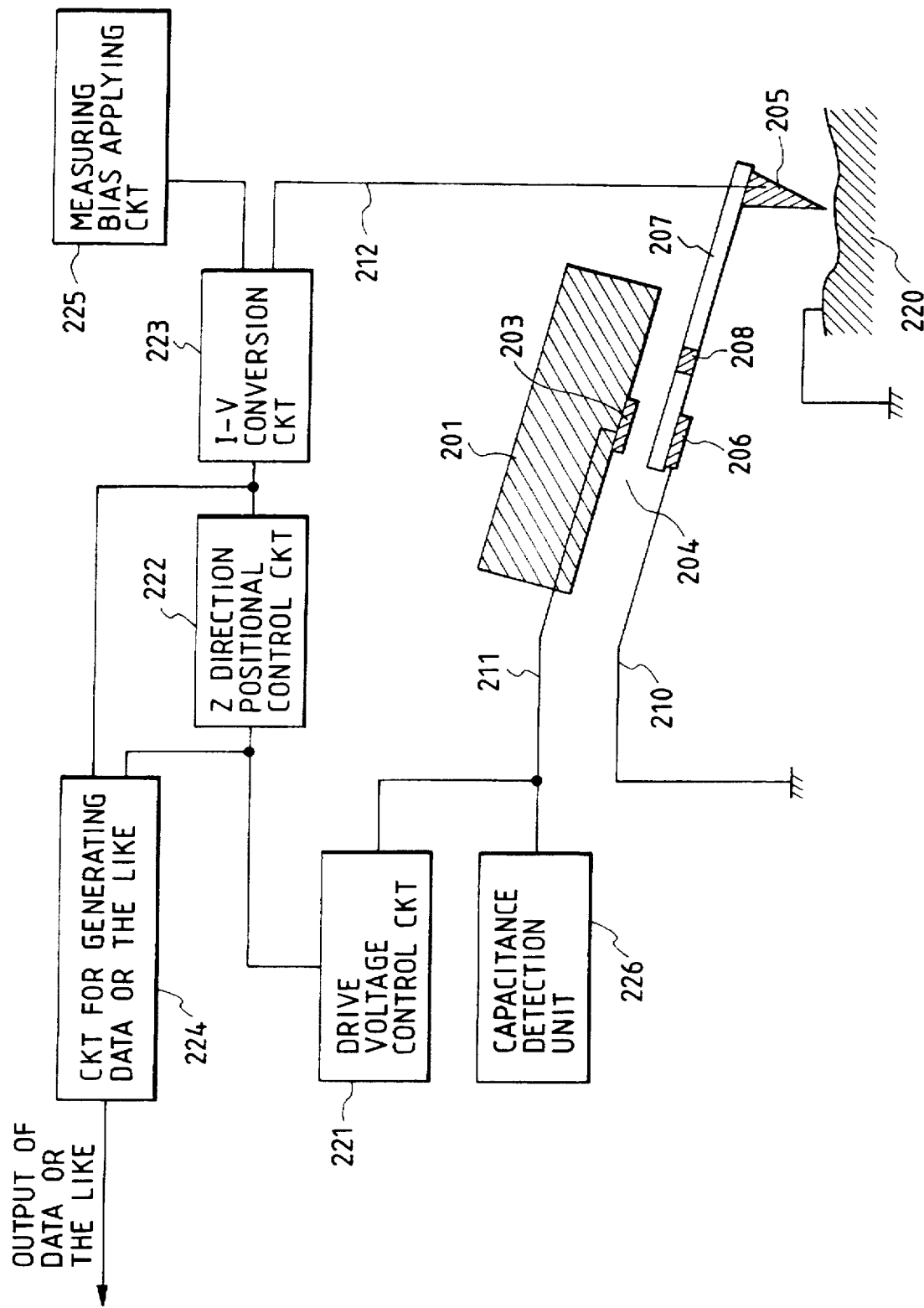

ELECTROSTATIC ACTUATOR, PROBE USING THE ACTUATOR, SCANNING PROBE MICROSCOPE, PROCESSING APPARATUS, AND RECORDING/REPRODUCING APPARATUS

BACKGROUND OF THE INVENTION

1. Field of the Invention

The present invention relates to an electrostatic actuator which is manufactured using micromechanics and performs displacement control using an electrostatic attraction, an electrostatically driven probe using the actuator, a scanning probe microscope (to be abbreviated as an SPM hereinafter), e.g., a scanning tunnel microscope (to be abbreviated as an STM hereinafter) or an atomic force microscope (to be abbreviated as an AFM hereinafter) using the electrostatically driven probe, a processing apparatus, and an information processing apparatus.

2. Related Background Art

Since an STM capable of directly observing the electron structure of the surface atom of a semiconductor was developed by G. Binnig et al. (Helv. Phys. Acta, 55,726 (1982)), SPM apparatuses which obtain various pieces of information by scanning a tip with a sharp point or micropatterning techniques to which an SPM is applied for the purpose of electrically, chemically, or physically processing a substrate have been studied and developed.

Such a micropatterning technique is also being applied to a memory technique.

The processing accuracy of such a micropatterning technique ranges from an atomic level to about several pm. When 1-bit information is recorded as, e.g., a several-nm structure, an information processing apparatus having a recording density of $10^{12}$ bit order can be realized with a just 1-cm square medium.

In recent years, various microactuators have been invented in the field of micromachining using a micropatterning technique such as a semiconductor photoprocess.

An SPM apparatus having a plurality of probes can be realized by using such microactuators for a positional control mechanism for an SPM tip, and the throughput of micropatterning or the transfer rate of the information processing apparatus is improved. Currently available microactuators will be exemplified below.

In the first example, a piezoelectric effect is utilized. A piezoelectric actuator having a cantilever with a piezoelectric bimorph structure is disclosed in U.S. Pat. No. 4,906,840 associated with this example.

In the second example, an electrostatic attraction acting between electrodes is utilized. A structure in which a voltage is applied to a movable electrode formed on a cantilever and a fixed electrode formed on a substrate to make an electrostatic attraction act to displace the cantilever (Japanese Laid-Open Patent Application No. 62-281138), or a structure in which the torsional properties of a torsion bar is used to electrostatically drive a plate portion supported by the torsion bar (Pertersen, IBM J. RES. DEVELOP., VOL. 24, NO. 5, Sep. 1980, pp. 631–637) has been proposed.

The second example has a simpler structure than the first example which utilizes the piezoelectric effect.

Several principles for driving an electrostatic actuator are conventionally known, though they have the following problems.

Consider an actuator which uses an electrostatic attraction generated upon application of a voltage to conductive parallel plates opposing each other.

The actuator of this type will be referred to as a parallel plate type actuator hereinafter.

FIG. 1 is a view showing the parallel plate type actuator. This actuator includes a fixed electrode 303, a movable electrode 306, and a bias spring 315. The fixed electrode 303 and the movable electrode 306 are conductive plates whose areas equal. The movable electrode 306 is supported by the bias spring to be movable while being kept parallel to the fixed electrode 303. A capacitance $C_1$ between the fixed electrode 303 and the movable electrode 306 of the parallel plate type actuator is given by the following equation:

$$C_1 = \frac{\epsilon_0 A}{d_0 - x}$$

where $\epsilon_0$ is the permittivity in vacuum, A is the area of the fixed electrode 303 and the movable electrode 306, $d_0$ is the initial gap between the electrodes, and x is the displacement of the movable electrode.

An electrostatic attraction $F_1$ obtained upon applying a predetermined voltage V between the fixed electrode 303 and the movable electrode 306 can be obtained by differentiating an electrostatic energy $E_1$ stored between the electrodes with the displacement x as follows:

$$E_1 = \frac{1}{2} C_1 V^2$$

$$F_1 = \frac{\partial E_1}{\partial x} = \frac{\epsilon_0 A V^2}{2(d_0 - x)^2}$$

A restoring force Fr of the bias spring 315 is given by the following equation:

$$Fr = -kx$$

where k is the spring constant of the bias spring 315.

In FIG. 2, the solid line represents the relationship between the displacement x and the electrostatic attraction $F_1$, and the dotted line represents the restoring force Fr.

When $V=V_1$, and x is $X_A$ or $X_B$, Fa equals Fr. When $x=x_A$, and displacement occurs in a direction of decreasing x, Fa becomes larger than Fr, so that a force acts in a direction of increasing x.

Inversely, when displacement occurs in the direction of increasing x, Fr becomes larger than Fa, so that a force acts in the direction of decreasing x.

That is, when $x-x_A$, a restoring force in a direction opposite to the change direction acts. Therefore, $x=x_A$ can be regarded as a stable equilibrium point.

When $x=x_B$, the force acts in the same direction as the change direction. For this reason, this point is not a stable point.

That is, the stable equilibrium point of the actuator for $V=V$ is $x=X_A$.

When $V=V_2$, Fa equals Fr at a point $x=d_o/3$.

A voltage $V_2$ at that time is called a pull-in voltage, which will be represented by Vc hereinafter.

When $V=V_3$, there is no point where Fa equals Fr, and the electrostatic attraction Fa is always larger than Fr. In this state, the displacement x of the actuator equals $d_o$. FIG. 3 shows the relationship between the voltage V and the displacement x of the actuator.

As the voltage V is increased, the displacement x of the actuator increases. When the voltage V reaches the pull-in voltage Vc, the displacement x increases to $d_o$ at once.

A technique for digitally displacing the actuator by using this phenomenon is also known (Japanese Laid-Open Patent Application No. 4-230723).

However, when a continuous displacement is necessary, the voltage V must be smaller than the pull-in voltage Vc, so that the maximum displacement is limited to be equal to or smaller than ⅓ the initial gap $d_o$.

That is, to increase the displacement, the initial gap $d_o$ must be increased.

However, if the drive voltage V does not change, the generation force $F_1$ of the parallel plate type actuator decreases because it is inversely proportional to the square of the interelectrode gap.

In addition, the behavior of the actuator is unstable near the pull-in voltage Vc and hard to control. For this reason, to stably use the actuator, the displacement must be much smaller than ⅓ the interelectrode gap $d_o$. For example, in an example disclosed in Japanese Laid-Open Patent Application No. 62-281138, the length of the cantilever is 100 µm, and the maximum displacement of the probe whose interelectrode distance is 6 µm is 0.2 µm. The maximum displacement is only 3.3% of the initial gap.

In consideration of the problem of the parallel plate type actuator, an actuator having a large displacement and good controllability, i.e., an actuator in which an interdigital transducer consisting of a fixed electrode and a movable electrode is operated is known.

The actuator of this type will be referred to as an interdigital transducer type actuator hereinafter.

FIG. 4 is a view showing the interdigital transducer type actuator.

Referring to FIG. 4, the actuator includes a movable electrode 606, a fixed electrode 603, and a bias spring 615.

The electrode 606 and the fixed electrode 603 have comb-like shapes and are arranged such that the electrode fingers are alternated.

A capacitance $C_2$ between the movable electrode 606 and the fixed electrode 603 is represented by the following equation:

$$C_2 = \frac{\epsilon_0 n t (b + x)}{g}$$

where n is the number of gaps, t is the thickness of the electrode finger, g is the interelectrode gap, and b is the initial length of a portion where the electrode fingers overlap.

As in the parallel plate type actuator, an electrostatic attraction $F_2$ can be obtained by differentiating an electrostatic energy $E_2$ with the displacement x:

$$E_2 = \frac{1}{2} C_2 V^2$$

$$F_2 = \frac{\partial E_2}{\partial x} = \frac{V^2}{2} \frac{\partial C_2}{\partial x} = \frac{\epsilon_0 n t V^2}{2g}$$

On the basis of the condition for balancing the electrostatic attraction $F_2$ and the restoring force $Fr=-kx$ of the bias spring 615, the displacement x of the actuator is given by the following equation:

$$x = \frac{\epsilon_0 n t V^2}{2gk}$$

FIG. 5 shows the relationship between the drive voltage V and the displacement x of the interdigital transducer type actuator.

As is apparent from FIG. 5, the displacement x is proportional to the square of drive voltage, so no pull-in voltage is present.

In addition, as is apparent from the above equation, the generation force of the interdigital transducer type actuator is proportional to the aspect ratio t/g of the gap of the interdigital transducer.

However, it is generally difficult to manufacture a structure with a high aspect ratio. When a normal semiconductor process is used, the aspect ratio is as high as 1 to 2.

For this reason, conventionally, a large generation force can hardly be obtained as compared to the parallel plate type actuator.

For example, in (P. Cheung, et al., "Modeling and position-detection of a polysilicon liner microactuator," DSC-Vol. 32, Micromechanical Sensors, Actuators, and Systems ASME 1991), t=2 µm, g=1.5 µm, and n=120. The aspect ratio is 1.3, and the generation force $F_2$ for V=30 V is $6.4 \times 10^{-7}$ N. This value is about ½₈ that obtained by a parallel plate type actuator having a 100-µm square electrode with a 1.5-µm gap, i.e., $F_1 = 1.8 \times 10^{-7}$ N.

To obtain a large displacement with a small generation force, the spring constant k of the bias spring must be decreased. In general, however, a decrease in spring constant k of the bias spring undesirably results in a decrease in resonance frequency of the system.

As described above, in the parallel plate type actuator, the controllability is poor, and the displacement is small. The interdigital transducer type actuator can avoid the problem of the parallel plate type actuator, i.e., the small displacement and poor controllability, though the generation force is small.

SUMMARY OF THE INVENTION

The present invention has been made to solve the problem of the prior art, and has as its object to provide an electrostatic actuator which has a larger displacement, better controllability, and a larger generation force than those of a conventional electrostatic actuator, an electrostatically driven probe using the electrostatic actuator, a scanning probe microscope such as a scanning tunnel microscope or an atomic force microscope using the electrostatically driven probe, a processing apparatus, and a recording/reproducing apparatus using these devices.

In order to achieve the above object, according to the present invention, there is provided an electrostatic actuator comprising:

a movable plate arranged on a substrate through a gap;

a movable electrode arranged on the movable plate; and a fixed electrode arranged on the substrate to oppose the movable electrode, wherein the movable electrode and the fixed electrode are arranged not to overlap at any portion in a direction perpendicular to a surface of the fixed electrode.

There is also provided an electrostatic actuator type probe, comprising a tip arranged at one end of a movable plate of the above electrostatic actuator.

There is also provided a scanning probe microscope having the above electrostatic actuator type probe, comprising:

moving means for moving the probe relative to a sample;

control means for controlling a voltage to be applied between a movable electrode and a fixed electrode to adjust a distance between the probe and the sample; and signal processing means for processing surface information of the sample which is obtained through the probe.

There is also provided a processing apparatus having the above electrostatic actuator type probe, comprising:

moving means for moving the probe relative to a sample as a target processing object;

control means for controlling a voltage to be applied between a movable electrode and a fixed electrode to adjust a distance between the probe and the sample; and processing means for applying a voltage between the probe and the sample to process the sample.

There is also provided a recording/reproducing apparatus having the above electrostatic actuator type probe, comprising:

moving means for moving the probe relative to a recording medium;

control means for controlling a voltage to be applied between a movable electrode and a fixed electrode to adjust a distance between the probe and the recording medium;

means for recording information on the recording medium by using the probe; and means for reproducing the information recorded on the recording medium by using the probe.

BRIEF DESCRIPTION OF THE DRAWINGS

FIG. 8 is a view showing the section of an electrostatically driven STM/AFM probe unit according to the second embodiment and the block diagram of a control circuit;

DETAILED DESCRIPTION OF THE PREFERRED EMBODIMENTS

The object of the present invention can be achieved by the above-described arrangement, and the contents of the present invention will be described below with reference to the accompanying drawings.

Figure 10:
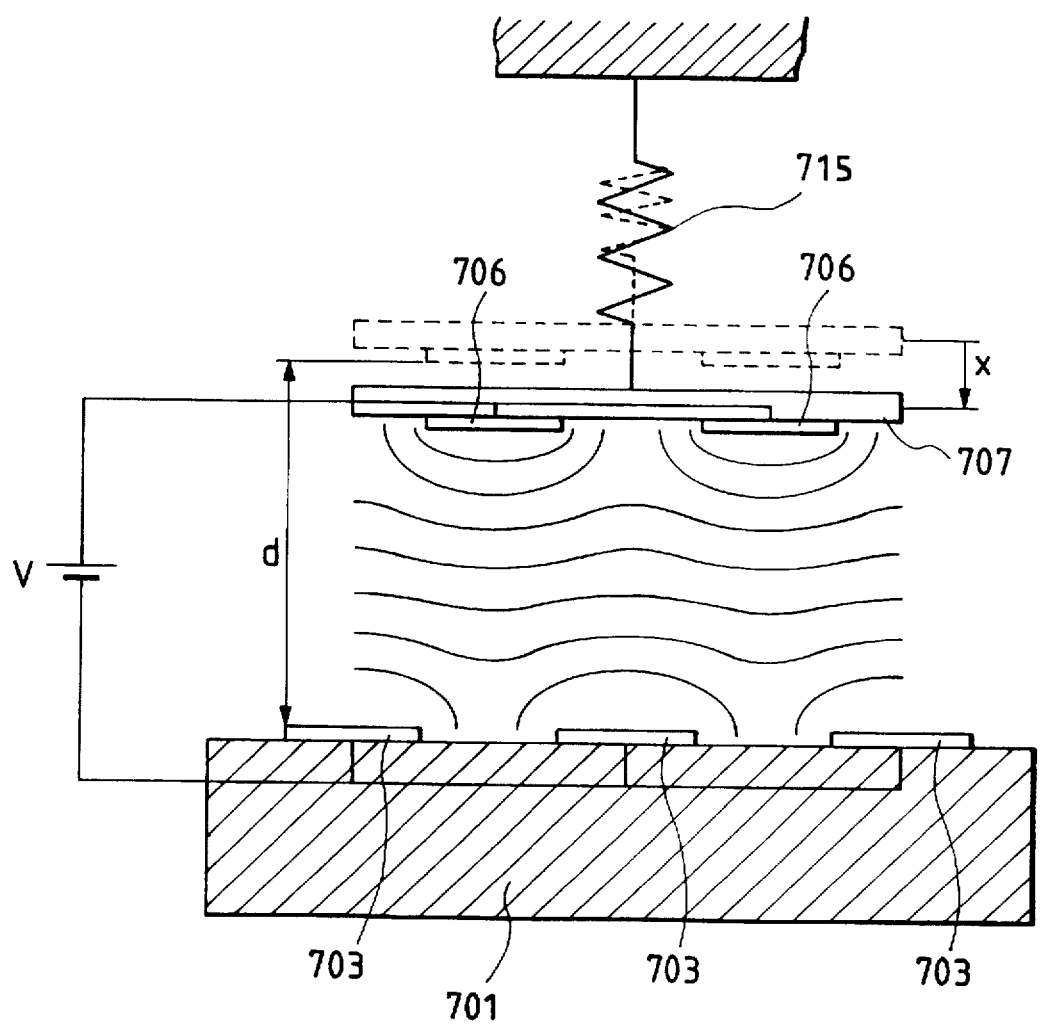
FIG. 10 is a view showing an actuator of the present invention.

FIG. 10 is a view showing an actuator of the present invention.

The actuator includes a substrate 701, a fixed electrode 703, a plate portion 706, a movable electrode 707, and a bias spring 715.

The fixed electrode 703 and the movable electrode 707 are alternated such that the fixed electrode 703 and the movable electrode 707 $d_o$ not overlap at any portions when the movable electrode 707 is projected in the driving direction (direction perpendicular to the surface of the fixed electrode).

As in the conventional parallel plate or interdigital transducer type actuator, the displacement is controlled by changing a drive voltage applied between the fixed electrode 703 and the movable electrode 707.

The generation force of the actuator of the present invention will be described below.

An electrostatic attraction F acting between the fixed electrode 703 and the movable electrode 707 can be obtained by differentiating an electrostatic energy E stored between the electrodes with a displacement x, as in the parallel plate or interdigital transducer type actuator.

This relationship will be shown below:

$$E = \frac{1}{2} CV^2$$

$$F = \frac{\partial E}{\partial x} = \frac{V^2}{2} \frac{\partial C}{\partial x}$$

Unlike the conventional parallel plate or interdigital transducer type actuator, a capacitance C between the electrodes of the actuator of the present invention can hardly be expressed by a simple equation. Thus, the present inventor calculated, by using the finite element method, the capacitance C when the interelectrode distance ($d_o$–x) was changed.

Figure 11:
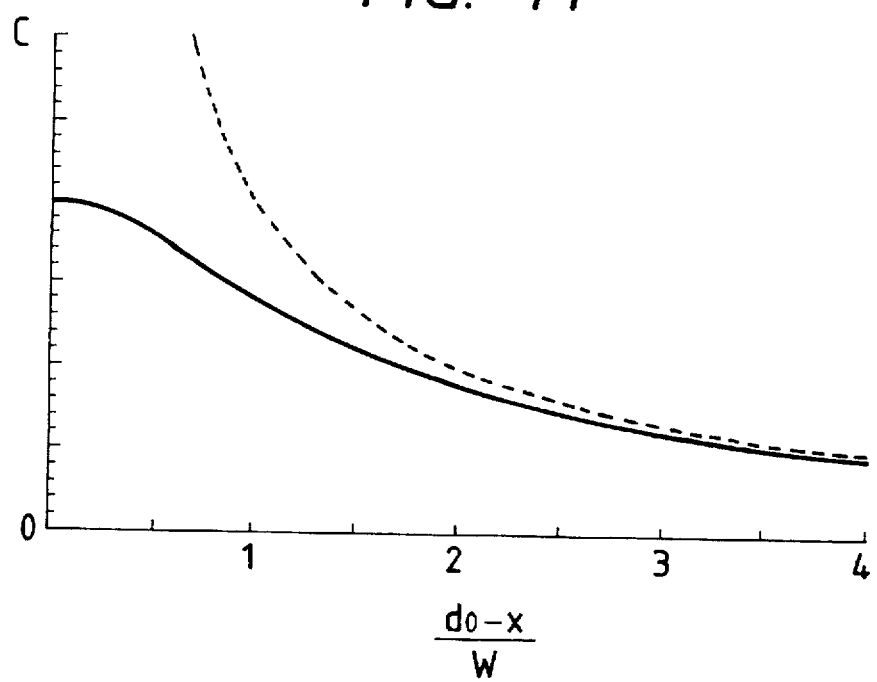
FIG. 11 is a graph for explaining the relationship between the interelectrode distance and the capacitance of the actuator of the present invention.

FIG. 11 shows the relationship between the interelectrode distance ($d_o$–x) and the capacitance C.

In FIG. 11, the abscissa represents the interelectrode distance ($d_o$–x) of the actuator of the present invention, which is a dimensionless value represented by a pitch W of electrode fingers. Along the ordinate, the interelectrode capacitance C per electrode finger is indicated by the solid line, and the capacitance of the parallel plate type actuator having the same electrode area is indicated by the dotted line.

Figure 12:
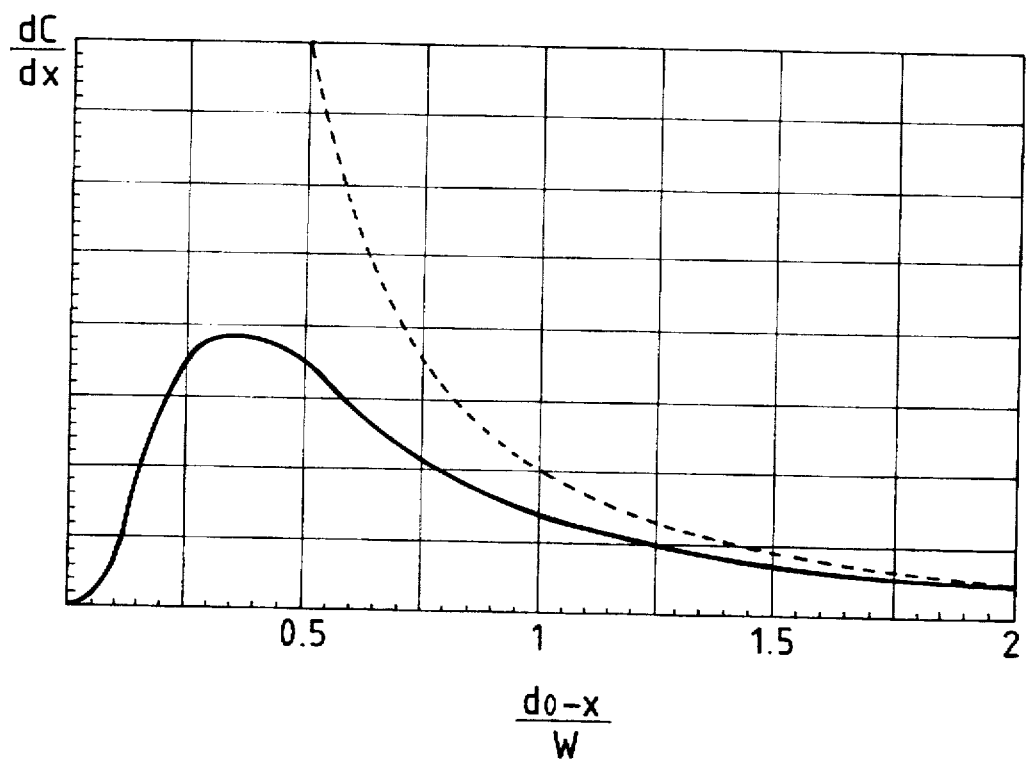
FIG. 12 is a graph for explaining the relationship between the interelectrode distance and dC/dx of the actuator of the present invention.

FIG. 12 is a graph plotting dC/dx.

Once dC/dx is defined, the electrostatic attraction F can be easily calculated from the above equation.

The displacement of the actuator of the present invention will be described below.

As in the conventional parallel plate or interdigital transducer type actuator described above, the displacement x of the actuator of the present invention can be obtained as a point where the electrostatic attraction F and the restoring force of the bias spring balance.

Figure 13A:
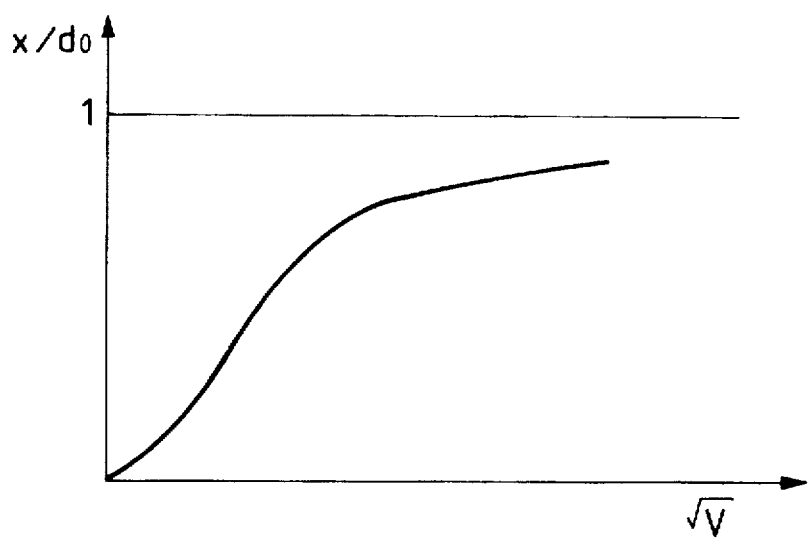
FIGS. 13A, 13B, and 13C are graphs for explaining the relationship between the drive voltage and the displacement of the actuator of the present invention.
Figure 13B:
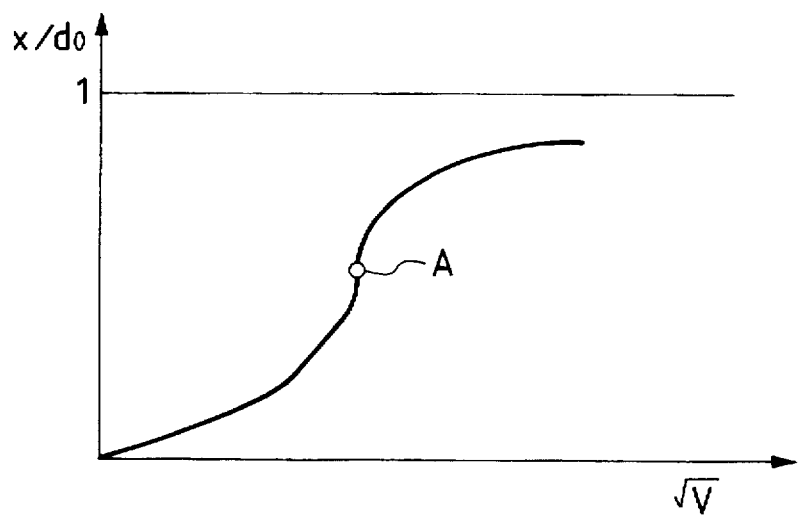
Figure 13C:
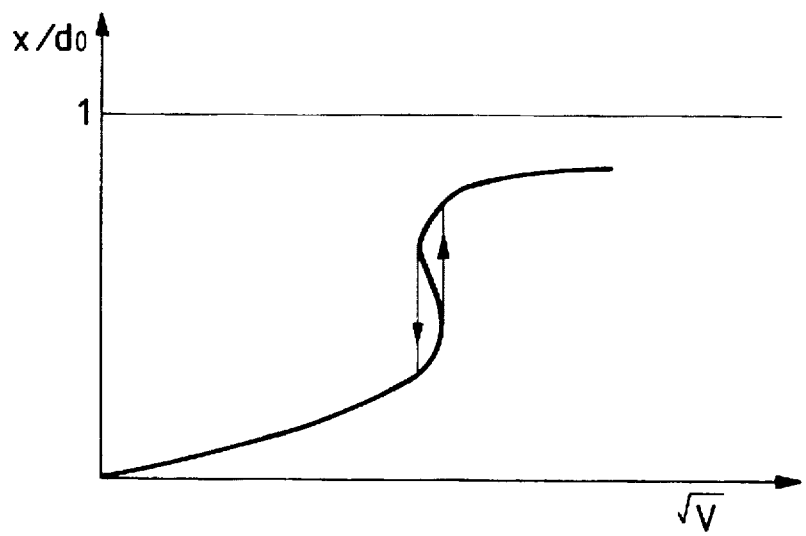

As the relationship between a drive voltage V and the displacement x, three patterns shown in FIGS. 13A to 13C can be considered in accordance with an initial gap $d_o$.

FIGS. 13A to 13C are graphs in which the abscissa represents the square root of the drive voltage V, and the ordinate represents the displacement x.

When the initial gap $d_o$ is sufficiently small, and the drive voltage V increases, the displacement x of the actuator monotonically increases, as shown in FIG. 13A.

When the initial gap $d_o$ reaches a certain value, the gradient of the curve indicating the displacement x with respect to the drive voltage V becomes infinite at a point A, as shown in FIG. 13B.

The initial gap at this time will be referred to as a critical gap dc hereinafter.

When the initial gap $d_o$ exceeds the critical gap dc, no continuous displacement can be obtained within a certain range, as shown in FIG. 13C.

A condition for continuous displacement will be described next.

In all patterns shown in FIGS. 13A, 13B, and 13C, no pull-in voltage for causing the movable electrode to collide against the fixed electrode is generated, unlike the parallel plate type actuator.

However, when continuous control must be performed over the entire displacement range of the actuator, the pattern shown in FIG. 13A must be used, as a matter of course. For this purpose, the initial gap $d_o$ must be smaller than the critical gap dc.

The present inventor has made extensive studies and found, by analysis using the finite element method, that the critical gap dc equaled the pitch w of electrode fingers.

Therefore, a condition for enabling continuous control over the entire displacement range can be given by the following inequality:

$$d_o < w$$

Within the range of this inequality, the actuator of the present invention can be continuously displaced even for a displacement larger than ⅓ the interelectrode gap $d_o$, though the conventional parallel plate type actuator can be continuously displaced only within ⅓ the interelectrode gap $d_o$.

The maximum displacement of the actuator of the present invention is limited by not the pull-in voltage but the upper limit of the power supply voltage or the discharge critical voltage between the electrodes.

In the present invention, by satisfying the above condition for continuous displacement, the actuator having an excellent controllability can be easily manufactured.

In the actuator of the present invention, when $d_o < w$ is satisfied, there is no point where the displacement becomes unstable. Therefore, the actuator of the present invention has a better controllability than that of the parallel plate type actuator whose displacement becomes unstable near the pull-in voltage.

In addition, the movable and fixed electrodes of the interdigital transducer type actuator of the present invention can be manufactured by a planar process. For this reason, the number of electrode fingers can be relatively easily increased, or the electrode fingers can be relatively easily made longer to increase the generation force.

An actuator having a larger generation force than that of the conventional interdigital transducer type actuator can be relatively easily manufactured.

Embodiments of the present invention will be described below in detail.

[First Embodiment]

An electrostatically driven STM apparatus according to the first embodiment will be described below with reference to the accompanying drawings.

Figure 1:
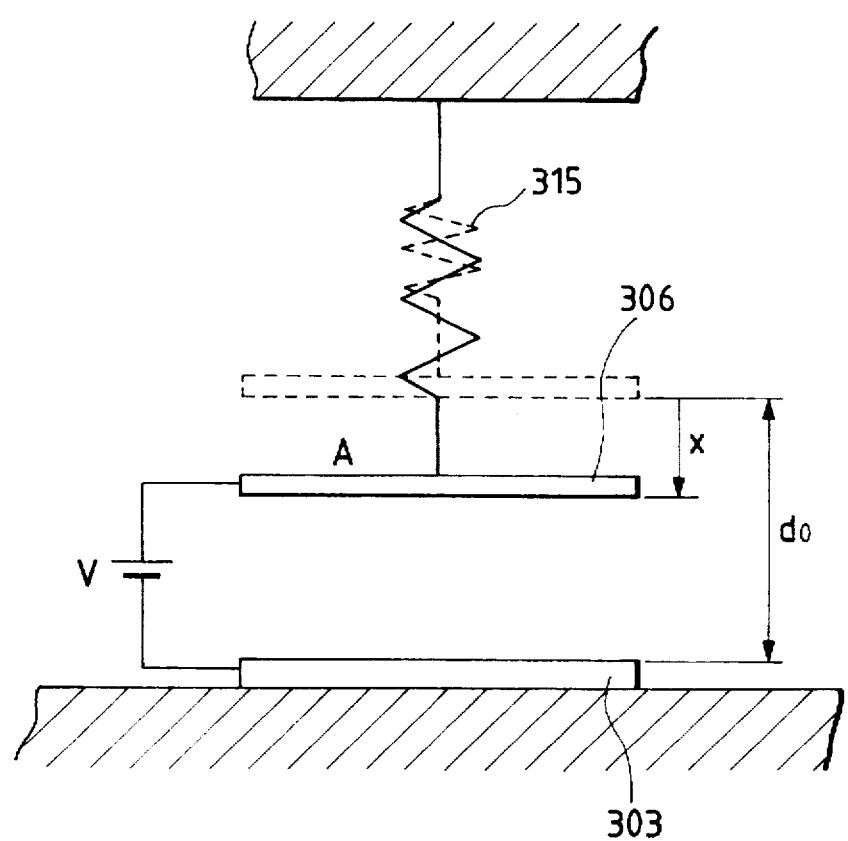
FIG. 1 is a view showing a conventional parallel plate type actuator.
Figure 2:
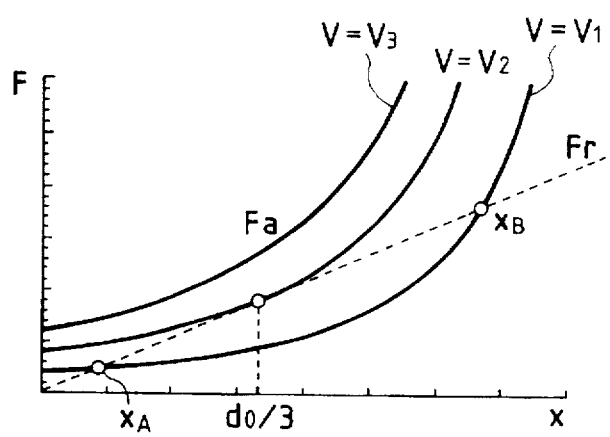
FIG. 2 is a graph for explaining the relationship between the displacement and the electrostatic attraction of the conventional parallel plate type actuator.
Figure 3:
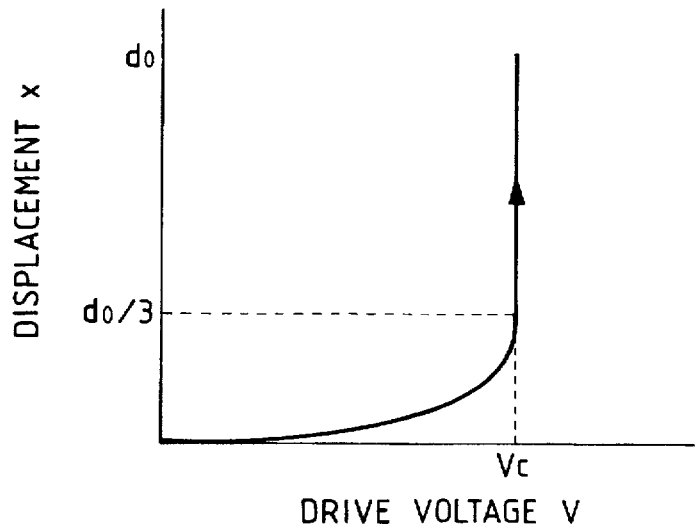
FIG. 3 is a graph for explaining the relationship between the drive voltage and the displacement of the conventional parallel plate type actuator.
Figure 5:
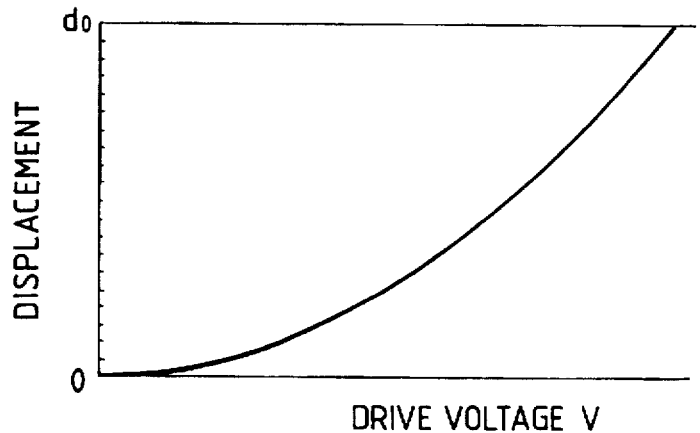
FIG. 5 is a graph for explaining the relationship between the drive voltage and the displacement of the conventional interdigital transducer type actuator.
Figure 4:
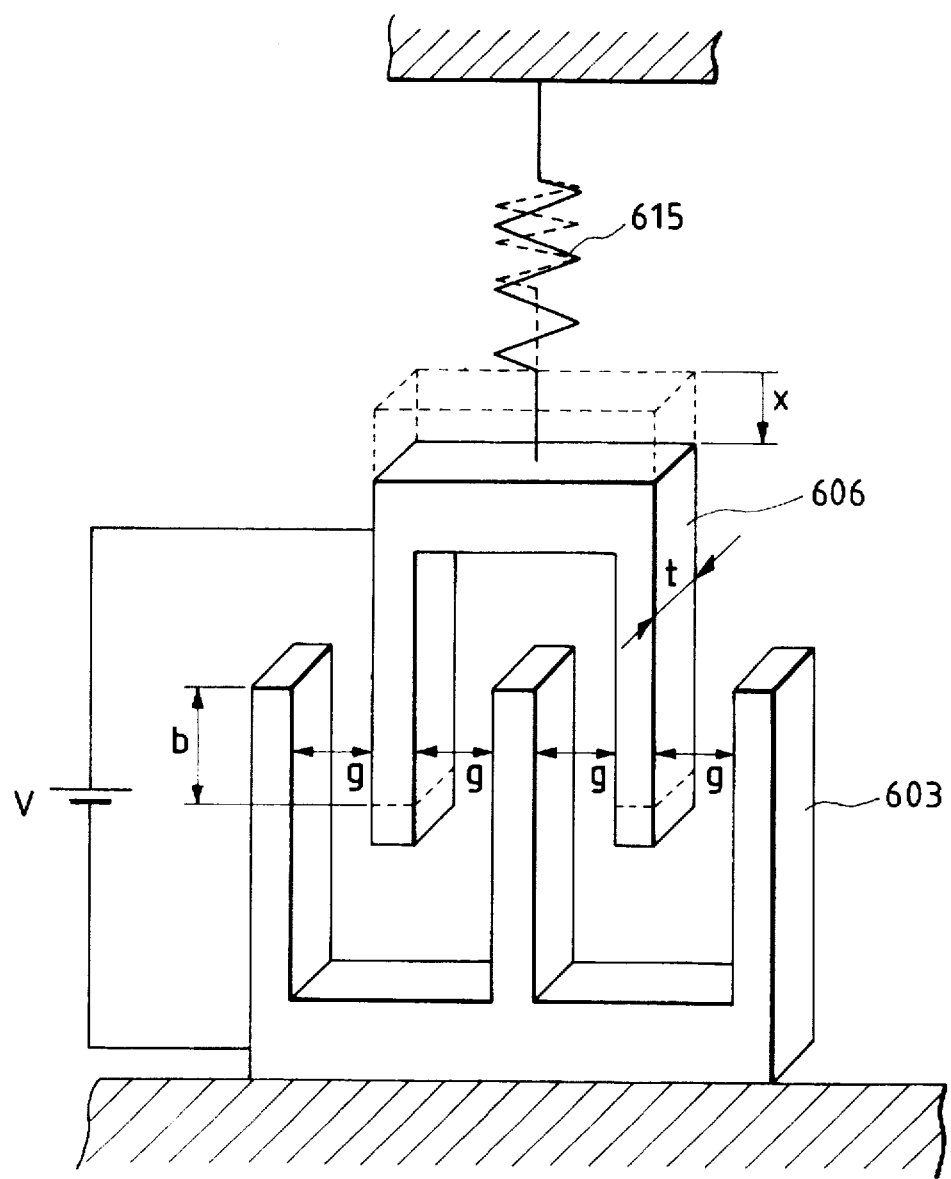
FIG. 4 is a view showing a conventional interdigital transducer type actuator.
Figure 6:
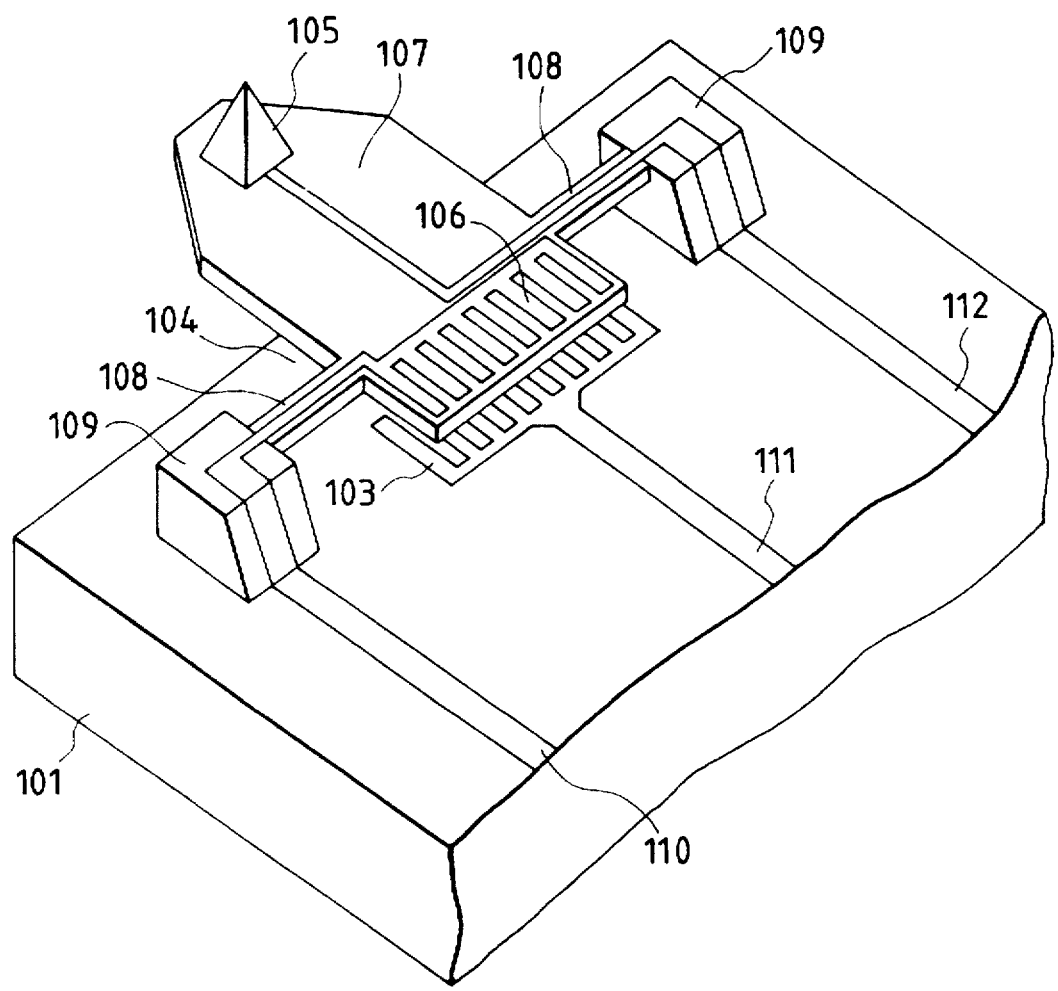
FIG. 6 is a perspective view of an electrostatically driven STM probe unit according to the first embodiment.
Figure 7:
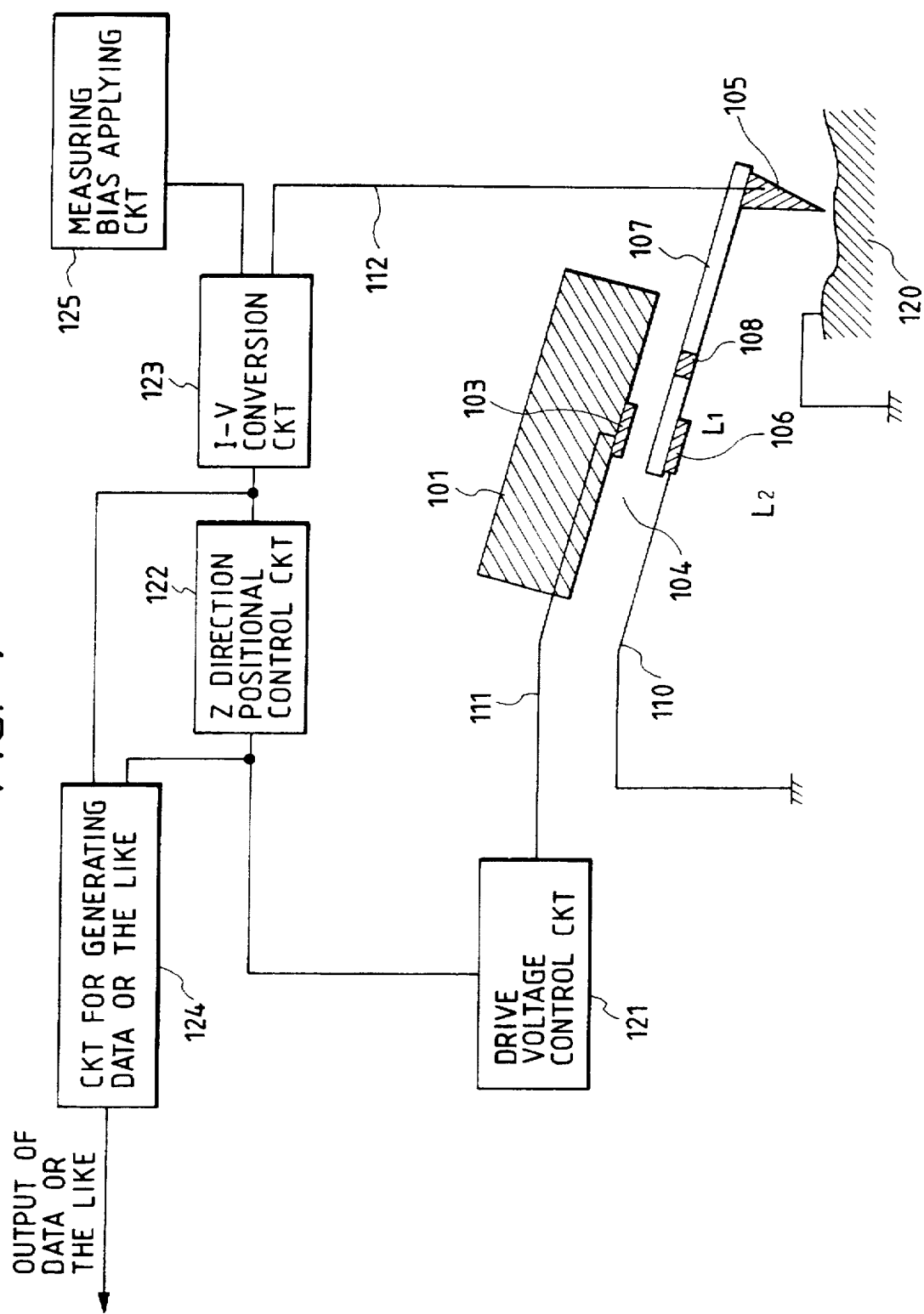
FIG. 7 is a view showing the section of the electrostatically driven STM probe unit according to the first embodiment and the block diagram of a control circuit.

FIG. 6 is a perspective view of the electrostatically driven probe unit of this embodiment. FIG. 7 is a view showing the section of the electrostatically driven probe unit shown in FIG. 6 and the block diagram of a control circuit.

A fixed electrode 103 is formed on an insulating substrate 101, and a plate portion 107 is formed on the resultant structure through an air gap 104.

The plate portion 107 is supported on a support portion 109 through a torsion bar 108 for rotatably supporting the plate portion 107. A conductive tip 105 for detecting a tunnel current is arranged at one end of the plate portion 107. A movable electrode 106 formed of a conductive thin film is arranged on the plate portion on the opposite side of the torsion bar 108 such that the movable electrode 106 opposes the fixed electrode 103.

Lines 110 to 112 respectively serve as a movable electrode drive voltage signal line, a fixed electrode drive voltage signal line, and a tunnel current detection signal line.

The fixed electrode 103 and the movable electrode 106 have complementary comb-like shapes, and the projection surfaces of these electrodes have no overlapping portions. The movable electrode 106 is biased to ground through the movable electrode drive voltage signal line 110. An observation sample 120 is biased to ground in this embodiment. A measuring bias applying circuit applies a measuring bias voltage to the tip 105. An I-V conversion circuit 123 converts, into a voltage signal, a tunnel current which is detected by the tip 105 and input through the tunnel current detection signal line 112.

The signal is transmitted to a Z direction positional control circuit 122. Upon receiving this signal, the Z direction positional control circuit 122 generates a voltage to be applied to the fixed electrode 103 through the fixed electrode drive voltage signal line 111. A circuit 124 for generating data or the like generates data for obtaining an image or information.

An STM measuring operation of the first embodiment will be described below.

A case in which the distance between the tip and the sample is controlled such that a constant tunnel current can be obtained (constant tunnel current mode) in this embodiment will be described first.

A predetermined measuring bias voltage in a predetermined amount with respect to the sample substrate 120 is applied to the tip 105 by a measuring bias applying circuit 125.

When the tip 105 is made close to the sample substrate 120 to a certain distance by a proximity device (not shown), a tunnel current starts to flow between the tip 105 and the sample substrate 120. This tunnel current signal is converted into a voltage signal by the I-V conversion circuit 123 and sent to the Z direction positional control circuit 122.

This tunnel current signal is used for distance control between the tip 105 and the sample substrate 120.

In this embodiment, the Z direction positional control circuit 122 sends control voltage data to a drive voltage control circuit 121 such that a predetermined tunnel current can be obtained. The drive voltage control circuit 121 calculates the voltage to be applied to the fixed electrode 103 on the basis of the control voltage value, and applies the calculated voltage to the fixed electrode 103 through the fixed electrode drive voltage signal line 111.

With these procedures, a feedback loop is formed so that constant tunnel current control is realized.

Next, to obtain a surface observation image, the tip 105 and the sample substrate 120 are moved relative to each other in a direction parallel to the sample surface (X and Y directions).

This operation will be referred to as X-Y scanning hereinafter.

The X-Y scanning mechanism is not illustrated in FIG. 7.

The tunnel current signal obtained by X-Y scanning is sent to the circuit 124 for generating data or the like. The tunnel current signal (current signal) obtained by X-Y scanning or a control signal (topographic signal) corresponding to the tunnel current signal is output to a position corresponding to the X- and Y-coordinates on a monitor (not shown) such as a CRT as a luminance or chrominance signal corresponding to the magnitude of the signal. With this arrangement, the sample surface can be observed as an image.

The functions of the respective electrodes will be described below.

When the tunnel current flowing between the tip 105 and the sample substrate 120 has a value smaller than a target current value, i.e., when the distance between the tip 105 and the sample substrate 120 is too large, the voltage to be applied from the drive voltage control circuit 121 to the fixed electrode 103 is increased.

Since the fixed electrode 103 and the movable electrode 106 move to attract each other, the tip 105 approaches the sample substrate 120 according to the seesaw motion.

To the contrary, when the tunnel current flowing between the tip 105 and the sample substrate 120 has a value larger than the target current value, i.e., when the distance between the tip 105 and the sample substrate 120 are too small, the voltage to be applied from the drive voltage control circuit 121 to the fixed electrode 103 is decreased.

With this operation, the tip 105 is separated from the sample substrate 120. The control voltage by the Z direction positional control circuit 122 is calculated using a digital PID control means (not shown). More specifically, the voltage value detected from the tunnel current signal by the I-V conversion circuit 123 is converted into a digital value, and a control output from the PID control means is calculated by a digital arithmetic circuit.

By appropriately adjusting the gain of the PID control means, feedback control can be kept stable.

In this embodiment, the width of the plate portion 107 was set at 90 μm.

The pitch of the electrode fingers of the comb-like movable electrode 106 was 10 μm, and the number of fingers was eight.

The fixed electrode 103 had nine electrode fingers. When viewed along a direction perpendicular to the substrate, the electrode fingers of the movable electrode 106 and those of the fixed electrode 103 were alternated. The distance between the movable electrode 106 and the fixed electrode 103 was 6 μm.

The maximum displacement of a portion of the movable electrode 106, which is farthest from the torsion bar 108, was set to be 3 μm.

With this maximum displacement, the ratio of the interelectrode distance, i.e., 3 μm, to the pitch of the electrode fingers, i.e., 10 μm was 0.3. The leverage of the plate portion was set such that the displacement of the tip 105 became 4 μm in correspondence with the maximum displacement of the actuator.

That is, the displacement of the tip was ±2 μm.

The surface of a thin film which was formed by resistance heating of Au was actually observed with the STM of the present invention, and the result was compared with the observation result of the conventional parallel plate torsion type mechanism.

The size of the three-dimensional patterns of this sample is considered as several pm for the entire substrate.

For the STM having the conventional mechanism, the displacement range was as small as ±1 μm. Sometimes, for a large recessed portion of the sample, no tunnel current was observed at all because the tip did not reach the bottom of the recessed portion, or inversely, for a large projecting portion, the tip was often in contact with the sample surface, and the tunnel current was saturated.

However, the observation apparatus of the present invention had a displacement range of ±2 μm. For this reason, saturation of the tunnel current or a region where no current flowed was not observed.

The circuit used in this embodiment is merely an example and is not limited to this arrangement. For example, the entire system can be controlled by an analog mechanism, as a matter of course.

[Second Embodiment]

In the second embodiment, an AFM/STM apparatus of the present invention will be described with reference to the accompanying drawings.

FIG. 8 is a view showing the section of a lever mechanism according to the second embodiment and the block diagram of a control circuit.

Reference numerals 201 to 215 correspond to 101 to 115 in the first embodiment, respectively.

The second embodiment is different from the first embodiment in that a capacitance detection unit 226 is arranged to use the apparatus as an AFM apparatus.

This apparatus can be used as an electrostatically driven STM apparatus in the same manner as in the first embodiment.

A method of using this apparatus as a capacitive AFM apparatus will be described next. A sample 220 and a tip 205 are brought into contact with each other under a predetermined weak pressure and fixed by a distance (Z direction) control mechanism (not shown) such that the distance between a substrate 201 and the sample 220 does not change, and X-Y scanning of the substrate 201 is performed in parallel to the sample surface. At this time, the tip 205 is vertically moved in accordance with the three-dimensional patterns on the surface of the sample 220. For this reason, the distance between a fixed electrode 203 and a movable electrode 206 changes, and the capacitance between the fixed electrode 203 and the movable electrode 206 changes. This change in capacitance is detected by the capacitance detection unit 226 and plotted in correspondence with the X-Y scanned positions, thereby obtaining the surface shape of the sample.

When the STM/AFM apparatus of this embodiment is used to observe the same region of the same sample in the STM and AFM modes, two pieces of information, i.e., the surface shape and the conductivity distribution can be checked without any confusion.

[Third Embodiment]

In this embodiment, a multi-STM apparatus having a plurality of plate portions with tips will be described below with reference to FIGS. 9A and 9B.

Figure 9A:
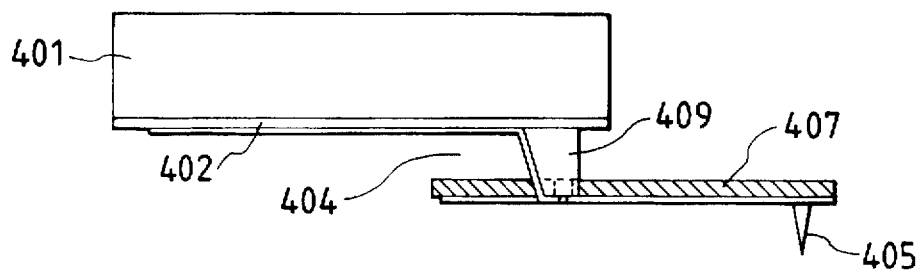
FIGS. 9A and 9B are sectional and plan views, respectively, showing a probe in an electrostatically driven multi-STM apparatus according to the third embodiment.
Figure 9B:
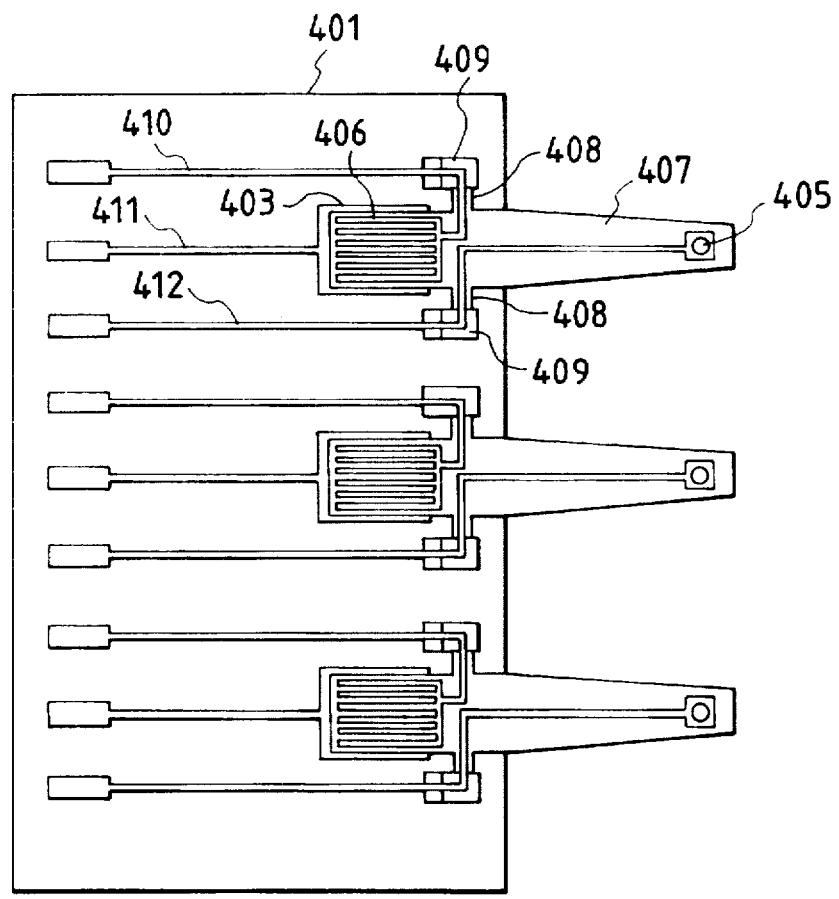

FIGS. 9A and 9B are sectional and plan views, respectively, for explaining probes in an electrostatically driven multi STM apparatus of this embodiment.

In FIGS. 9A and 9B, basically, three STM probes (FIG. 6) shown in the first embodiment are formed within the same substrate.

Reference numerals 401 to 414 correspond to 101 to 114, respectively.

In this embodiment, a substrate 401 is formed of silicon. Therefore, unlike the first embodiment, an insulating layer 402 is formed on the surface to insulate the electrodes on the substrate from each other.

By using a semiconductor process, the plurality of probes can be easily manufactured without any variations.

In addition to the linear arrangement, two-dimensional arrangement, e.g., a matrix arrangement can be employed.

In this embodiment, the torsion type plate portions can be independently driven. That is, a plurality of portions can be simultaneously subjected to STM observation.

[Fourth Embodiment]

In this embodiment, the electrostatically driven STM apparatus (FIGS. 6 and 7) shown in the first embodiment and a silicon wafer on which gold (Au) is deposited are set in an evacuated chamber, and tungsten hexafluoride ($WF_6$) gas is supplied into the chamber such that the degree of vacuum in the chamber becomes about $1 \times 10^{-4}$ Torr.

In this state, STM observation of the sample (Au) surface is performed. Tungsten is deposited on the sample surface in correspondence with the tip scanned portion.

Even in selective deposition on the sample surface or processing such as etching by such an STM apparatus arrangement, etching at a larger depth or deposition at a larger thickness can be effectively performed because the apparatus of the present invention has a larger displacement along the Z-axis than that of the conventional apparatus.

[Fifth Embodiment]

In this embodiment, a multi-STM apparatus having a plurality of probes, which has been described in the third embodiment, is used, electrical processing is performed for a recording medium as a sample to write recording bits, and information is actually recorded/reproduced/erased using the bits. As a sample serving as a recording medium, an SOAZ-Langmuir-Blodgett (LB) film (two-layered film) stacked on an Au electrode is used. This recording medium is disclosed in Japanese Laid-Open Patent Application Nos. 63-161552 and 63-161553.

As the Au electrode, an Au film formed by resistance heating and used in the first embodiment is used.

By using a tip on a plate portion, a bias voltage on which a continuous pulse voltage having peak values of −6 V and +1.5 V is superposed is applied between the tip and the recording medium, thereby electrically writing information.

To read out the written information, a tunnel current is measured by the same scanning method as in the STM apparatus. A bit signal which is written by electrical processing is extracted from the obtained tunnel current signal, and the written information is reproduced from the extracted bit signal.

For the reproduced information, saturation or non-detection state of the tunnel current signal is not observed, and information is not omitted, either. Therefore, the written information can be completely reproduced.

A bias voltage on which an inverted pulse voltage is superposed is applied between the tip and the recording medium in correspondence with the series of portions where information has been written once. Thereafter, the series of portions with bits are scanned to measure the tunnel current. The tunnel current value equals that corresponding to a portion without any bit. That is, it can be confirmed that the written data is erased. In this manner, according to the present invention, stable tip control can be performed even in an erase operation.

Recording/reproduction by the STM apparatus based on the third embodiment has been described above. In a similar manner, recording/reproduction can be performed by an AFM/STM composite machine.

In the AFM/STM composite machine, information is written by applying a bias voltage by a tip, as in the STM apparatus. While maintaining a predetermined distance between the medium and the tip by an AFM mechanism, the information is read out from a change in observed tunnel current, thereby realizing recording/reproduction.

The erase operation was also confirmed by the same method as that described in the former portion of this embodiment.

[Sixth Embodiment]

Figure 14:
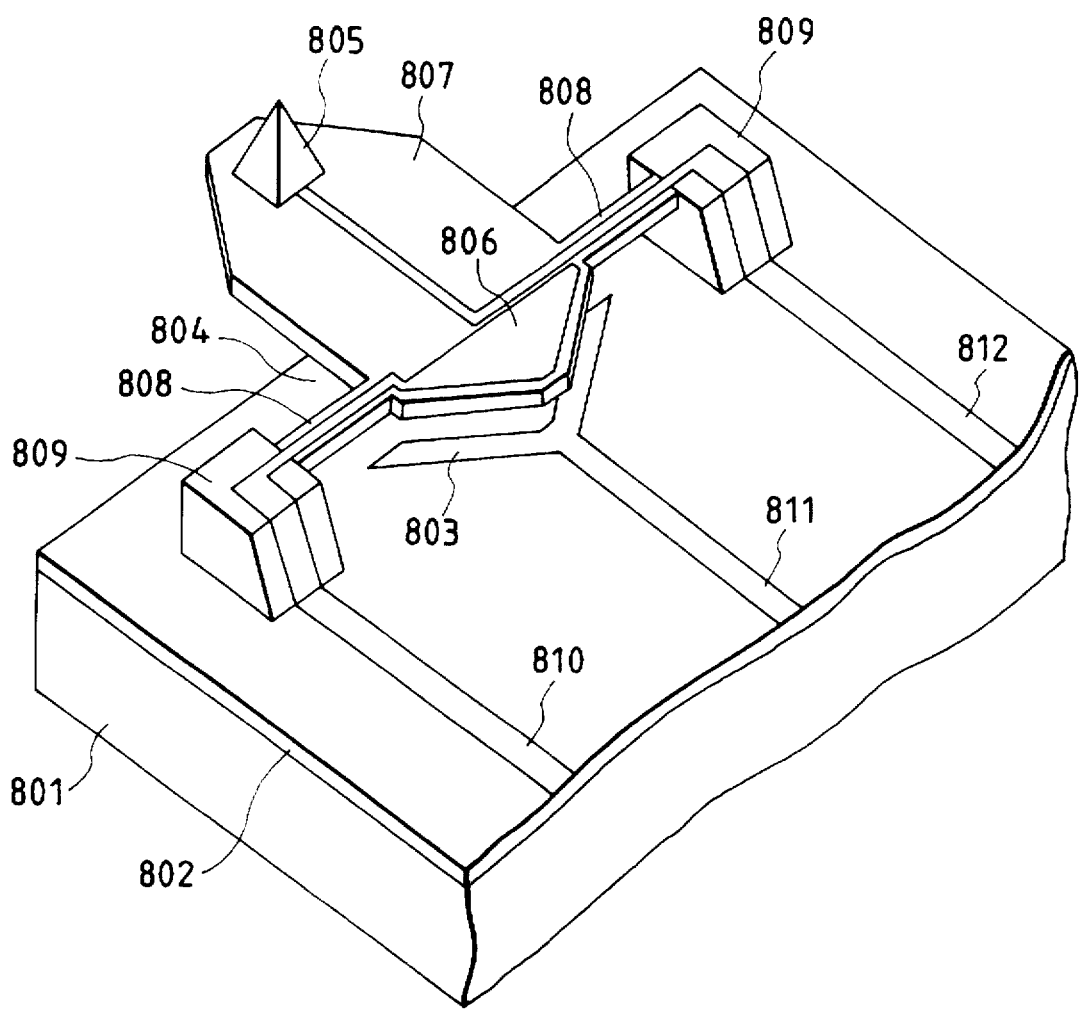
FIG. 14 is a perspective view of an electrostatically driven probe unit according to the sixth embodiment.

FIG. 14 is a perspective view of an electrostatically driven probe unit according to the sixth embodiment. The sixth embodiment is different from the first embodiment in that the shape of the fixed electrode 103 of the first embodiment changes from the comb-like shape to a Y shape, and the shape of the movable electrode 106 changes from the comb-like shape to a trapezoidal shape. In this embodiment, the movable electrode is driven in a direction perpendicular to the movable electrode when the actuator is driven. A movable electrode 806 is arranged not to overlap a fixed electrode 803 at any portions when the movable electrode 806 is projected in its driving direction.

The electrostatically driven probe unit of this embodiment can be used like the electrostatically driven probe unit of the first embodiment except that the drive voltage is high.

The electrostatic actuator of the present invention has no pull-in voltage, as described above. For this reason, a larger displacement than that of the conventional parallel plate type actuator can be obtained. In addition, without any point where the displacement becomes unstable, an actuator having a better controllability than that of the conventional parallel plate type actuator can be realized.

In the present invention, an electrostatic actuator having a larger generation force than that of the conventional interdigital transducer type actuator can be easily manufactured.

The electrostatically driven probe constituted by the electrostatic actuator of the present invention can take a larger displacement of the tip than that of the prior art. Therefore, when a scanning probe microscope is constituted using the electrostatic actuator of the present invention, the three-dimensional patterns on the surface can be more accurately observed.

Similarly, when a processing apparatus is constituted using the electrostatic actuator of the present invention, etching at a larger depth or deposition at a larger thickness is enabled. When a recording/reproducing apparatus is constituted using the electrostatic actuator of the present invention, a medium having larger three-dimensional patterns than those of the prior art can be used.

What is claimed is:

1. An electrostatic actuator comprising:

a movable plate arranged on a substrate through a gap;

a movable electrode arranged on said movable plate; and a fixed electrode arranged on said substrate to oppose said movable electrode, wherein said movable electrode and said fixed electrode are arranged not to overlap at any portion in a direction perpendicular to a surface of said fixed electrode.

2. An actuator according to claim 1, wherein said movable electrode and said fixed electrode have comb-like shapes.

3. An actuator according to claim 2, wherein when a distance between said movable electrode and said fixed electrode is represented by d, and a pitch of electrode fingers of said comb-like electrode is represented by W, the following relation is satisfied:

$$d < W$$

4. An electrostatic actuator type probe, comprising a tip arranged at one end of said movable plate of said electrostatic actuator of any one of claims 1 to 3.

5. A scanning probe microscope having said probe of claim 4, comprising:

moving means for moving said probe relative to a sample;

control means for controlling a voltage to be applied between a movable electrode and a fixed electrode to adjust a distance between said probe and said sample; and signal processing means for processing surface information of said sample which is obtained through said probe.

6. A processing apparatus having said probe of claim 4, comprising:

moving means for moving said probe relative to a sample as a target processing object;

control means for controlling a voltage to be applied between a movable electrode and a fixed electrode to adjust a distance between said probe and said sample; and processing means for applying a voltage between said probe and said sample to process said sample.

7. A recording/reproducing apparatus having said probe of claim 4, comprising:

moving means for moving said probe relative to a recording medium;

control means for controlling a voltage to be applied between a movable electrode and a fixed electrode to adjust a distance between said probe and said recording medium;

means for recording information on said recording medium by using said probe; and means for reproducing the information recorded on said recording medium by using said probe.

* * * * *

UNITED STATES PATENT AND TRADEMARK OFFICE
CERTIFICATE OF CORRECTION

PATENT NO. : 5,753,911

DATED : May 19, 1998

INVENTOR(S) : SUSUMU YASUDA, ET AL.

It is certified that error appears in the above-identified patent and that said Letters Patent is hereby corrected as shown below:

ON THE TITLE PAGE:

AT [56] REFERENCES CITED

FOREIGN PATENT DOCUMENTS

"4230723  8/1992  Japan" should read
--4-230723  8/1992  Japan--.

COLUMN 1

Line 29, "a memory technique" should read --memory technology--;
Line 31, "pm." should read --$\mu$m.--;
Line 34, "a just" should read --just a--; and
Line 60, "example" should read --example,--.

UNITED STATES PATENT AND TRADEMARK OFFICE
CERTIFICATE OF CORRECTION

PATENT NO. : 5,753,911
DATED : May 19, 1998
INVENTOR(S) : SUSUMU YASUDA, et al.

It is certified that error appears in the above-identified patent and that said Letters Patent is hereby corrected as shown below:

COLUMN 2

Line 7, "areas" should read --areas are--;
Line 15, "in" should read --constant of a--;
Line 28, "
$$F_1 = \frac{\partial E_1}{\partial x} = \frac{\epsilon_0 A V^2}{2(d_0 - x)^2}$$
"
should read
$$-F_1 = \frac{-\partial E_1}{\partial x} = \frac{\epsilon_0 A V^2}{2(d_0 - x)^2} --;$$
Line 38, "represents" should read
--represents the absolute value of--;
Line 39, "$X_A$ or $X_B$," should read --$x_A$ or $x_B$,--; and
"$x=x_A$." should read --$x=x_A$,--;
Line 40, "a direction" should read --the direction--;
Line 41, "a force" should read --the net force-- and
"a direction" should read --the direction--;
Line 44, "a force" should read --the net force--; and
Line 53, "V=V" should read --$V=V_1$-- and
"$x=X_A$." should read --$x=x_A$.--.

COLUMN 3

Line 23, "operated" should read --operated,--;
Line 43, "lap." should read
--lap with the displacement X=0.--;
Line 45, "an" should read --the--; and
Line 46, "with" should read --with respect to--.

UNITED STATES PATENT AND TRADEMARK OFFICE
CERTIFICATE OF CORRECTION

PATENT NO. : 5,753,911

DATED : May 19, 1998

INVENTOR(S) : SUSUMU YASUDA, ET AL.

It is certified that error appears in the above-identified patent and that said Letters Patent is hereby corrected as shown below:

COLUMN 4

Line 12, "position-detection of a polysilicon liner micro-actuator,"" should read --Position-Detection of a Polysilicon Liner Microactuator,"--.
    Line 14, "Systems" should read --Systems,--; and
    Line 18, "$F_1=1.8\times10^{-7}N.$" should read --$F_1=1.8\times10^{-5}N.$--.

COLUMN 6

Line 10, "$d_o$ not" should read --do not--;
    Line 23, "an" should read --the--;
    Line 24, "with a" should read --with respect to the--;
    Line 36, "inventor" should read --inventors--;
    Line 45, "which is" should read --expressed as-- and "represented by a" should read --in terms of the--; and
    Line 46, "electrode" should read --the electrode--.

COLUMN 7

Line 25, "inventor has" should read --inventors have--;
    Line 41, "limited by not" should read --limited, not by-- and "but" should read --but by--; and
    Line 50, "a" should be deleted.

COLUMN 8

Line 2, "the" should read --a--; and
    Line 7, "through" should read --across--.

UNITED STATES PATENT AND TRADEMARK OFFICE
CERTIFICATE OF CORRECTION

PATENT NO. : 5,753,911

DATED : May 19, 1998

INVENTOR(S) : SUSUMU YASUDA, ET AL.

Page 4 of 5

It is certified that error appears in the above-identified patent and that said Letters Patent is hereby corrected as shown below:

COLUMN 9

Line 67, "pm" should read --$\mu$m--.

COLUMN 10

Line 58, "multi STM" should read --multi-STM--.

COLUMN 11

Line 26, "which has been" should read
--such as the probe--; and
Line 33, "Application" should read --Applications--.

COLUMN 12

Line 48, "through" should read
--and spaced from said substrate by--.

COLUMN 13

Line 6, "said sample;" should read --the sample;--;
Line 9, "said sample" should read --the sample--;
Line 16, "a movable" should read --said movable-- and
"a fixed" should read --said fixed--; and
Line 17, "said" (second occurrence) should read --the--.

UNITED STATES PATENT AND TRADEMARK OFFICE
CERTIFICATE OF CORRECTION

PATENT NO. : 5,753,911

DATED : May 19, 1998

INVENTOR(S) : SUSUMU YASUDA, ET AL.

It is certified that error appears in the above-identified patent and that said Letters Patent is hereby corrected as shown below:

COLUMN 14

Line 2, "said" (both occurrences) should read --the--;
    Line 9, "a" (both occurrences) should read --said--;

Line 13, "said" should read --the--; and

Signed and Sealed this

Twenty-third Day of February, 1999

Q. TODD DICKINSON

*Attest:*

*Attesting Officer*     *Acting Commissioner of Patents and Trademarks*